(12) United States Patent
Ueda

(10) Patent No.: US 11,194,976 B2
(45) Date of Patent: Dec. 7, 2021

(54) POSITION LOCATING SYSTEM, POSITION LOCATING METHOD, AND NON-TRANSITORY COMPUTER-READABLE MEDIUM

(71) Applicant: SATO HOLDINGS KABUSHIKI KAISHA, Tokyo (JP)

(72) Inventor: Yoshiyuki Ueda, Yokohama (JP)

(73) Assignee: SATO HOLDINGS KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/956,127

(22) PCT Filed: Feb. 15, 2019

(86) PCT No.: PCT/JP2019/005612
§ 371 (c)(1),
(2) Date: Jun. 19, 2020

(87) PCT Pub. No.: WO2019/187756
PCT Pub. Date: Oct. 3, 2019

(65) Prior Publication Data
US 2020/0320256 A1 Oct. 8, 2020

(30) Foreign Application Priority Data
Mar. 29, 2018 (JP) .............................. JP2018-066028

(51) Int. Cl.
| G06K 7/10 | (2006.01) |
| H04W 4/33 | (2018.01) |
| H04W 4/029 | (2018.01) |
| H04W 4/80 | (2018.01) |

(52) U.S. Cl.
CPC ..... *G06K 7/10099* (2013.01); *G06K 7/10376* (2013.01); *H04W 4/029* (2018.02); *H04W 4/33* (2018.02); *H04W 4/80* (2018.02)

(58) Field of Classification Search
CPC . G06K 7/10099; G06K 7/10376; H04W 4/33; H04W 4/029; H04W 4/80
See application file for complete search history.

(56) References Cited

U.S. PATENT DOCUMENTS

| 9,602,976 | B1 * | 3/2017 | Notohardjono | ....... H04W 4/029 |
| 10,667,091 | B1 * | 5/2020 | Zhao | ..................... H04W 4/023 |
| 2017/0195855 | A1 * | 7/2017 | Na | ....................... G01S 5/0257 |

FOREIGN PATENT DOCUMENTS

| JP | 2011-226959 A |   | 11/2011 |
| JP | 2011226959 A | * | 11/2011 |
| JP | 2013-086912 |   | 5/2013 |
| JP | 2014-065566 A |   | 4/2014 |

(Continued)

*Primary Examiner* — Mohamed Barakat
(74) *Attorney, Agent, or Firm* — Foley & Lardner LLP

(57) ABSTRACT

A position locating system includes: a position locating tag provided in an indoor space, the position locating tag being associated with position information in the indoor space in advance; a tag information acquisition unit provided on a mobile body moving in the indoor space, the tag information acquisition unit being configured to read a signal transmitted from the position locating tag; and a mobile-body position locating unit configured to locate a position of the mobile body based on the signal from the position locating tag read by the tag information acquisition unit.

13 Claims, 12 Drawing Sheets

(56) References Cited

FOREIGN PATENT DOCUMENTS

| | | | |
|---|---|---|---|
| JP | 2014065566 A | * | 4/2014 |
| JP | 2017-044501 A | | 3/2017 |
| KR | 20150101377 A | * | 9/2015 |
| WO | WO-2005/050246 A1 | | 6/2005 |

* cited by examiner

POSITION LOCATING SYSTEM, POSITION LOCATING METHOD, AND NON-TRANSITORY COMPUTER-READABLE MEDIUM

TECHNICAL FIELD

The present invention relates to a position locating system, a position locating method, and a non-transitory computer-readable medium.

BACKGROUND ART

Conventionally, a system for detecting a position of a mobile body by reading an active RFID tag attached to the mobile body with a plurality of active RFID (Radio Frequency Identifier) readers provided in an warehouse has been proposed (see JP2013-086912A).

SUMMARY OF INVENTION

However, when the active RFID tag attached to the mobile body is to be read by the active RFID readers provided in the warehouse, if there are many loads in the warehouse, there is a risk in that radio wave is blocked by the loads. In such a case, the active RFID readers cannot read the active RFID tag, and it becomes impossible to locate the position of the mobile body in the warehouse.

The present invention has been conceived in light of the problems mentioned above, and an object thereof is to locate a position of a mobile body regardless of a situation in an indoor space.

According to one aspect of the present invention, a position locating system includes: a position locating tag provided in an indoor space, the position locating tag being associated with position information in the indoor space in advance; a tag information acquisition unit provided on a mobile body moving in the indoor space, the tag information acquisition unit being configured to read a signal transmitted from the position locating tag; and a position locating unit configured to locate a position of the mobile body based on the signal from the position locating tag read by the tag information acquisition unit.

According to one aspect of the present invention, it is possible to locate the position of the mobile body regardless of a situation in the indoor space.

DESCRIPTION OF EMBODIMENTS

A position locating system 100 according to an embodiment of the present invention will be described below with reference to the drawings.

The position locating system 100 performs management, for example, in an indoor warehouse 1, by locating a position of a forklift truck 10 serving as a mobile body and by locating a position of a load L serving as a target object.

The warehouse 1 to which the position locating system 100 is applied will be first described with reference to FIG. 1.

Figure 1:
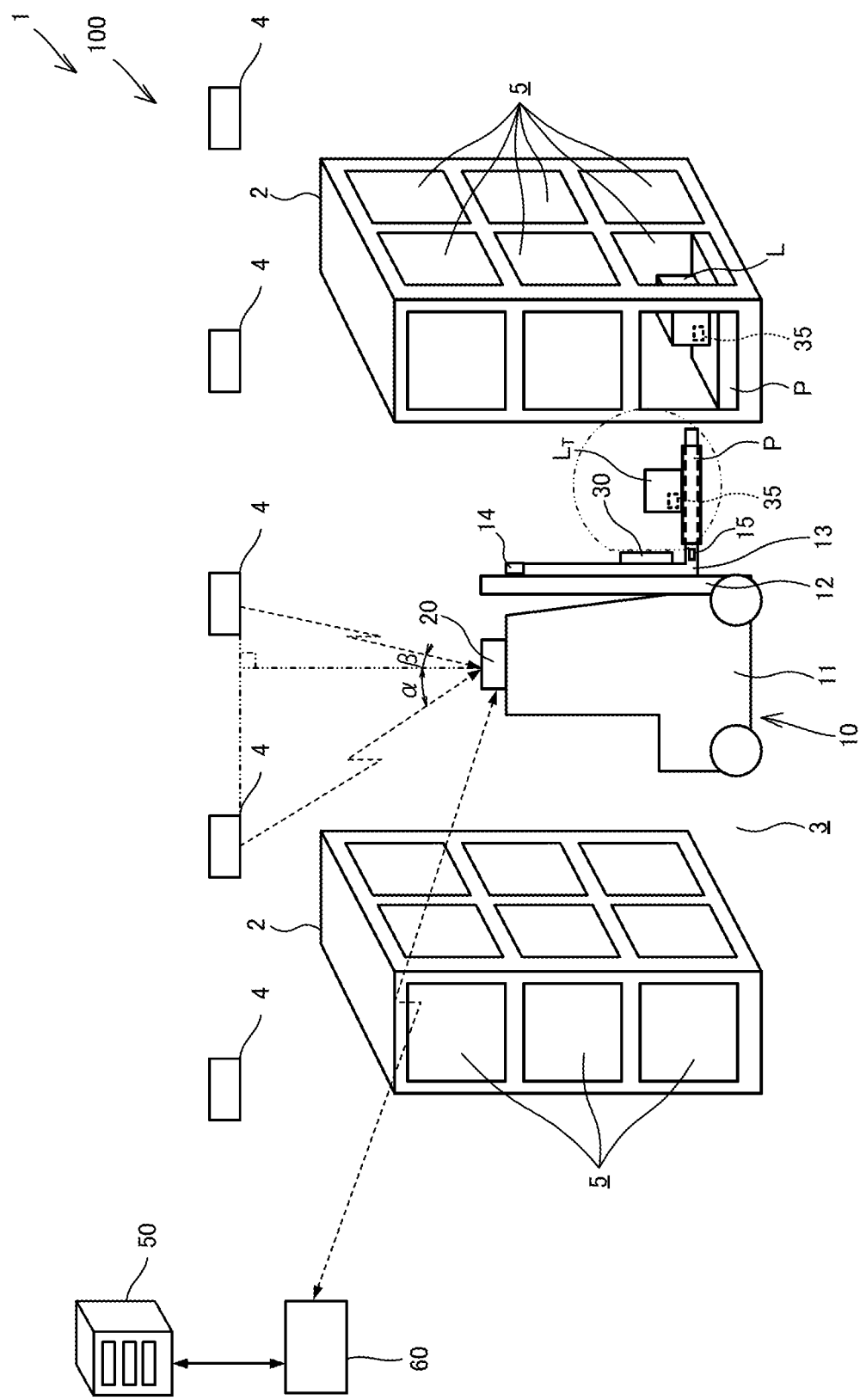
FIG. 1 is a configuration diagram of an warehouse in which a position locating system according to an embodiment of the present invention is used.

As shown in FIG. 1, the warehouse 1 has a plurality of shelves 2 that receives the load L and a passage 3 that is provided between the shelves 2.

The shelves 2 are arranged in the warehouse 1 so as to be parallel with each other along the length-wide direction. The shelves 2 each has a plurality of receiving portions 5 formed such that the load L can be inserted into and taken out from the passage 3.

The receiving portions 5 are spaces for receiving pallets P on which the load L is loaded. The plurality of receiving portions 5 are provided so as to be arranged side by side in the length-wide direction of the shelves 2, and the plurality of receiving portions 5 are also provided so as to be arranged side by side in the height direction of the shelves 2.

The passage 3 is provided so as to allow the forklift truck 10, which transports a load $L_T$ serving as a transport target object, to travel therethrough. The passage 3 has a width that is sufficient for allowing the forklift truck 10 to travel therethrough and that is sufficient for the forklift truck 10 to insert and take the load L into and out from the receiving portions 5 of the shelves 2.

The forklift truck 10 has a main body portion 11, a mast 12, forks 13 serving as a vertically moving portion, and a gravimetric sensor 15 serving as a load holding state detector.

The main body portion 11 has a motive power source so as to be able to travel. The main body portion 11 is provided integrally with the mast 12 to which the forks 13 are attached so as to be able to move up and down.

The forks 13 are a pair of claws for holding the load $L_T$. The forks 13 hold a bottom surface of the load $L_T$, or the forks 13 hold the load $L_T$ via the pallet P by being inserted into the pallet P on a top surface of which the load $L_T$ is placed. The forks 13 are moved up and down, thereby moving the load $L_T$ up and down.

The gravimetric sensor 15 detects that the load $L_T$ is held by the forks 13 on the basis of the weight of the load $L_T$. The gravimetric sensor 15 transmits to a vehicle-mounted device 20, which will be described later, an electric signal corresponding to the weight of the load $L_T$. Instead of employing the gravimetric sensor 15, for example, an infrared sensor may be provided to detect that the load $L_T$ is held by the forks 13.

Figure 2:
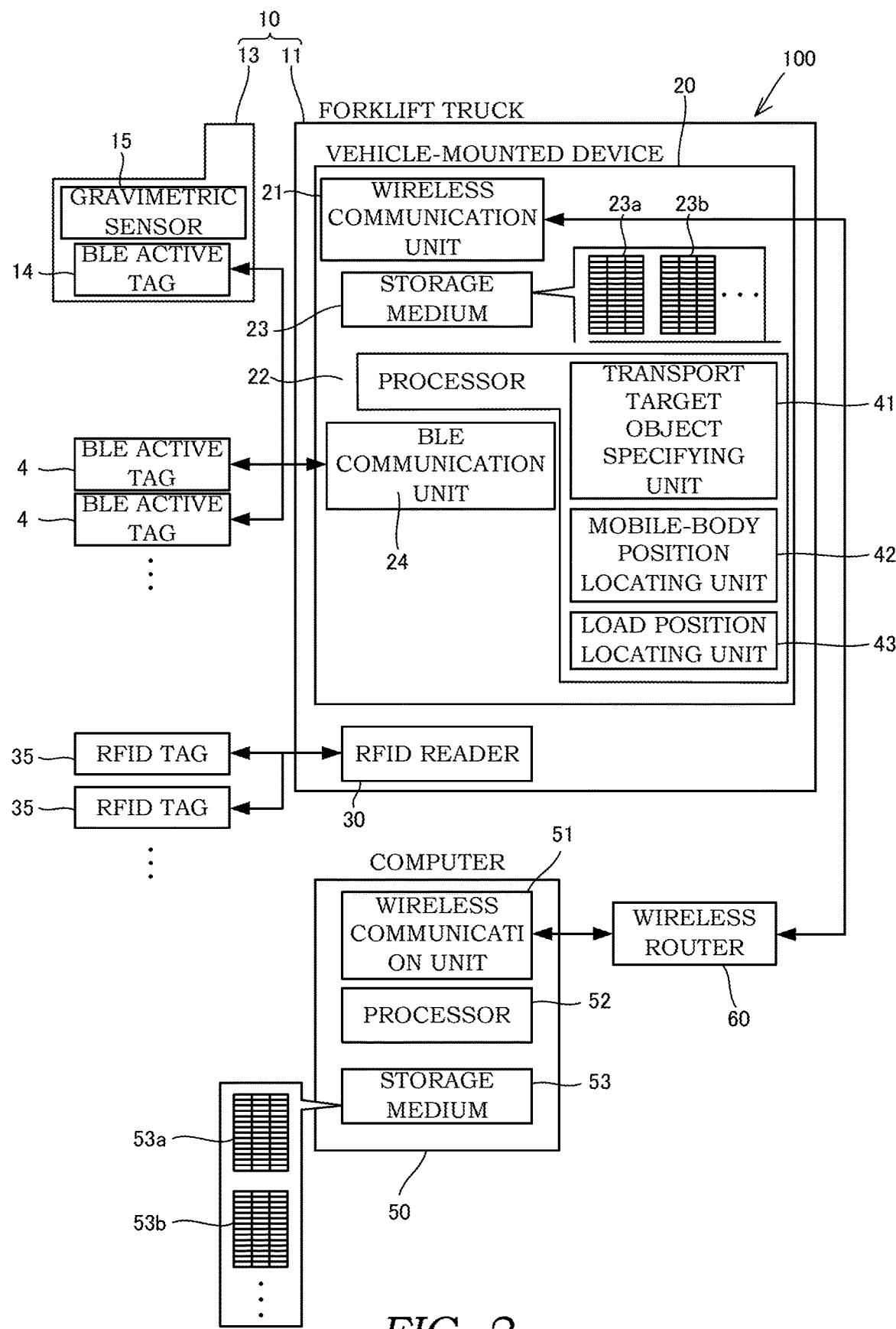
FIG. 2 is a block diagram of the position locating system.

Next, the position locating system 100 will be described with reference to FIGS. 1 and 2.

The position locating system 100 is provided with a plurality of BLE (Bluetooth Low Energy) active tags 4 serving as position locating tags, the vehicle-mounted device 20 that is provided on the forklift truck 10, a BLE active tag 14 serving as a height locating tag, an RFID (Radio Frequency Identifier) reader 30 serving as a reader device, an RFID tag 35 serving as a passive tag that is attached to each of the load L, a computer 50, and a wireless router 60.

The BLE active tags 4 are provided in, for example, the warehouse 1 and are managed in association with position information in the warehouse 1 in advance. the position information of the BLE active tags 4 are, for example, coordinates in the X axis direction (the longitudinal direction), the Y axis direction (the lateral direction), and the Z axis direction (the height direction) with the origin at an arbitrary point in the warehouse 1. The BLE active tags 4 are, for example, respectively attached to lighting fixtures that are provided by being hanged from a ceiling in the warehouse 1. The BLE active tags 4 respectively have batteries, and respectively transmit the signals to a BLE communication unit 24 serving as a tag information acquisition unit, which will be described later, of the vehicle-mounted device 20.

The BLE active tag 4 can be additionally provided in an arbitrary position in the warehouse 1. In a case in which it is difficult to establish a communication between the BLE communication unit 24 and the BLE active tags 4 in the warehouse 1, it is possible to provide an additional BLE active tag 4 on, for example, a top portion of a side surface of the shelf 2 facing the passage 3. In the case in which the BLE active tag 4 is additionally provided, similarly to the BLE active tags 4 already provided, the BLE active tag 4 is managed in association with the position information in the warehouse 1 in advance.

The BLE active tag 14 is provided on the forks 13 of the forklift truck 10. The BLE active tag 14 is moved up and down together with the forks 13. The BLE active tag 14 has a battery and transmits the signal to the BLE communication unit 24, which will be described later, of the vehicle-mounted device 20.

The vehicle-mounted device 20 is provided on a top surface of the main body portion 11 of the forklift truck 10. The vehicle-mounted device 20 has: a wireless communication unit 21 that performs communication with the computer 50; a processor 22 that executes various arithmetic processing; a storage medium 23 that stores a data base 23a containing various programs, a data base 23b, and so forth; and the BLE communication unit 24. The data base 23b contains: in association with each other, tag identification information for identifying the BLE active tags 4 provided in the warehouse 1; the position information in the warehouse 1 associated with the tag identification information; information related to the loads L stored in the warehouse 1; information provided in the RFID tag 35 attached to each load L; information of the storage site of each load L; and so forth. The vehicle-mounted device 20 has a function as a computer.

Instead of such a configuration, it may be possible to configure the vehicle-mounted device 20 with a plurality of microcomputers. For example, a microcomputer that controls the wireless communication unit 21 and a microcomputer that controls the RFID reader 30 may be provided separately from the vehicle-mounted device 20. In addition, it may be possible to configure such that the function of the vehicle-mounted device 20 as the computer is executed by the computer 50.

The processor 22 has, for example, a transport target object specifying unit 41, a mobile-body position locating unit 42, and a load position locating unit 43 serving as a target object position locating unit. The transport target object specifying unit 41, the mobile-body position locating unit 42, and the load position locating unit 43 function as the processor 22 executes the program contained in the data base 23a in the storage medium 23.

For example, the transport target object specifying unit 41 specifies the load $L_T$ that is the transport target object on the basis of a difference in a change of a state of a reflected signal from the RFID tag 35 read by the RFID reader 30 when the forklift truck 10 is moved.

In addition, the transport target object specifying unit 41 determines that the load $L_T$ attached with the RFID tag 35 is unloaded on the receiving portion 5, when, for example, the state of the reflected signal from the RFID tag 35 attached to the load $L_T$ is changed.

The mobile-body position locating unit 42 specifies the position information of the vehicle-mounted device 20, in other words, the position information of the forklift truck 10 on the basis of the incident angles α [deg] and β [deg] of the respective signals that have been transmitted from at least two BLE active tags 4 and received by the vehicle-mounted device 20 (see FIG. 1) and on the basis of the position information of the two BLE active tags 4 that have transmitted the signals received by the vehicle-mounted device 20. A process of locating the position of the forklift truck 10 by the mobile-body position locating unit 42 will be described later in detail with reference to FIG. 4.

In this embodiment, even if the forklift truck 10 moves in the warehouse 1, the position of the vehicle-mounted device 20 in the Z axis direction will not change. Thus, the mobile-body position locating unit 42 may locate the position of the forklift truck 10 in the X axis direction and the Y axis direction by performing communication with the two BLE active tags 4.

In a case in which the vehicle-mounted device 20 is provided on the forks 13 instead of the main body portion 11 of the forklift truck 10, or in a case in which the vehicle-mounted device 20 is provided on other mobile body or an operator instead of the forklift truck 10, not only the positions in the X axis direction and the Y axis direction, but also the position in the Z axis direction can be located.

The load position locating unit 43 locates the position of the load $L_T$ unloaded in the warehouse 1 on the basis of the travelling position of the forklift truck 10. Specifically, the mobile-body position locating unit 42 locates the position of the forklift truck 10 on the basis of the incident angles α and β of the respective signals transmitted from the two BLE active tags 4 and on the basis of the position information of those BLE active tags 4. Therefore, when the load $L_T$ is unloaded, for example, the load position locating unit 43 can specify the travelling position of the forklift truck 10 located by the mobile-body position locating unit 42 as the unloaded position of the load $L_T$.

Figure 3:
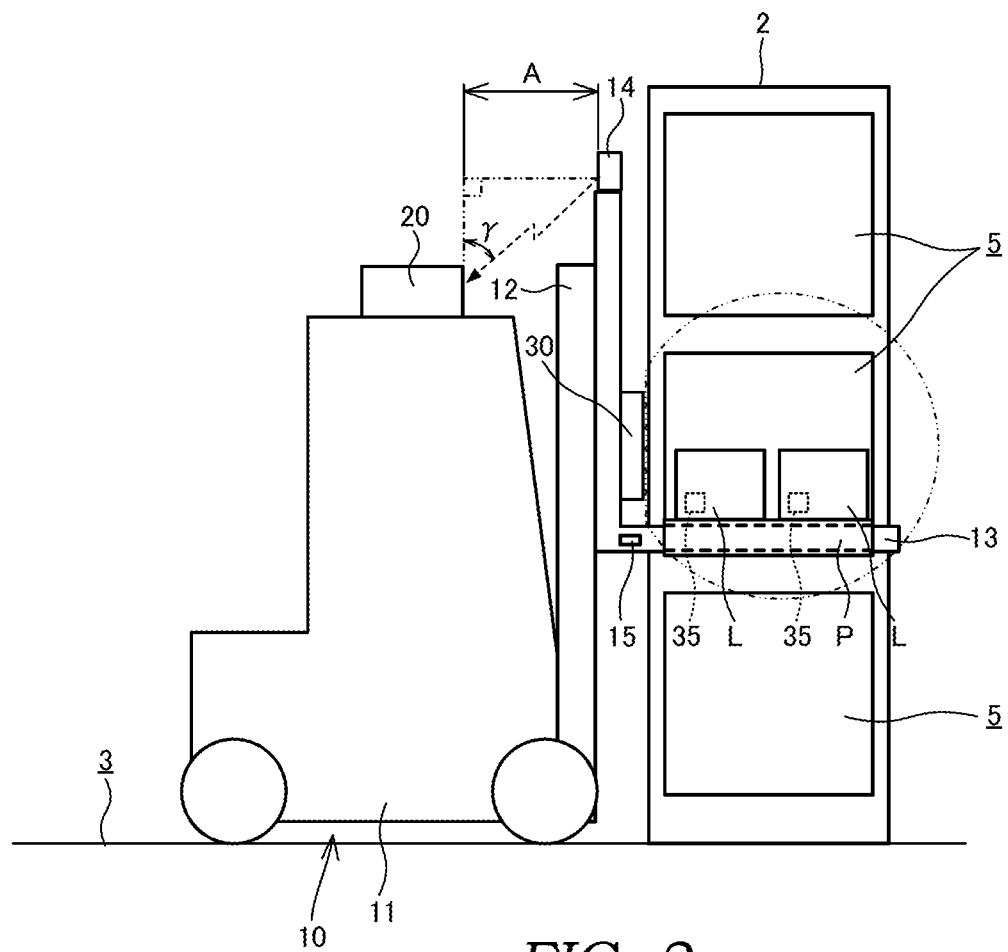
FIG. 3 is a side view for explaining a process of locating a position of a transport target object in the height direction.

In addition, At this time, as shown in FIG. 3, the BLE communication unit 24 reads the signal transmitted from the BLE active tag 14.

The load position locating unit 43 locates the unloaded position of the load $L_T$ in the height direction on the basis of the incident angle γ [deg] of the signal from the BLE active tag 14. In the forklift truck 10, the distance A [mm] between the vehicle-mounted device 20 and the mast 12 does not change. Therefore, if the incident angle γ of the signal from the BLE active tag 14 is known, it is possible to locate the position of the BLE active tag 14 in the height direction, in other words, the position in the height direction between the vehicle-mounted device 20 and the BLE active tag 14. Therefore, the load position locating unit 43 can locate the position of the forks 13 in the height direction on the basis of the preset position of the vehicle-mounted device 20 in the Z axis direction (the position in the height direction) and the position in the height direction between the vehicle-mounted device 20 and the BLE active tag 14. With such a configuration, it is possible to locate which receiving portion 5 in the height direction of the shelf 2 the forklift truck 10 has unloaded the load $L_T$.

The BLE communication unit 24 can perform communication in the BLE mode, and constantly performs the communication with each of the BLE active tags 4 and the BLE active tag 14 that are also capable of performing the communication in the BLE mode. The BLE communication unit 24 reads the signals transmitted by the BLE active tags 4 and the BLE active tag 14.

The RFID reader 30 is provided on the forks 13 of the forklift truck 10. The RFID reader 30 transfers radio wave to the RFID tag 35 and reads the reflected signal returned from the RFID tag 35. The RFID reader 30 transfers the radio wave to the RFID tag 35 when the gravimetric sensor 15 has detected that the load $L_T$ is held by the forklift truck 10.

The RFID tag 35 is the passive tag that does not have a power source and that is operated by utilizing the radio wave transferred from the RFID reader 30 as an energy source. After receiving the radio wave transferred from the RFID reader 30, the RFID tag 35 returns the reflected signal. In a case in which information, etc. of the storage sites of the loads L is managed in units of the pallet P, instead of attaching the RFID tag 35 to each load L, the RFID tag 35 may be attached to the pallet P.

The computer 50 has: a wireless communication unit 51 that performs communication; a processor 52 that executes various arithmetic processing; and a storage medium 53 that stores a data base 53a that contains various programs, a data base 53b, and so forth. The data base 53b contains: in association with each other, the tag identification information for identifying the BLE active tags 4 provided in the warehouse 1; the position information in the warehouse 1 associated with the tag identification information; the information related to the loads L stored in the warehouse 1; the information provided in the RFID tag 35 attached to each load L; the information of the storage site of each load L; and so forth.

The computer 50 is connected to the wireless communication unit 21 of the vehicle-mounted device 20 via the wireless router 60. The wireless router 60 may be built-into the computer 50.

Figure 4:
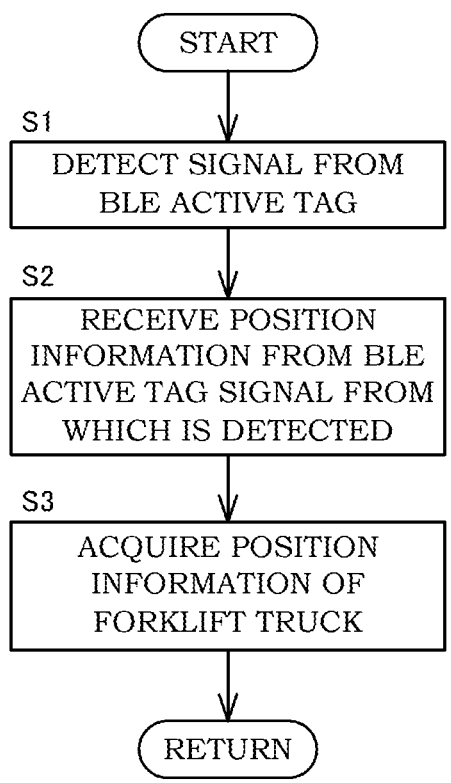
FIG. 4 is a flowchart for a process of locating a position of the mobile body in the position locating system.

Next, the process of locating the position of the forklift truck 10 in the position locating system 100 will be described with reference to FIG. 4. The computer 50 repeatedly executes a routine shown in FIG. 4 at fixed time intervals of, for example, 10 milliseconds.

In Step S1, the BLE communication unit 24 detects the signals transmitted from the BLE active tags 4. At this time, the BLE communication unit 24 reads the signals transmitted from the two BLE active tags 4, for example.

In Step S2, from the signals from the two BLE active tags 4 read by the BLE communication unit 24, the vehicle-mounted device 20 acquires the tag identification information respectively identifying the BLE active tags 4. In addition, from the two tag identification information, the vehicle-mounted device 20 acquires the two position information of the BLE active tags 4 associated with the tag identification information in advance. By respectively setting the position information to the BLE active tags 4 in advance, the vehicle-mounted device 20 can also respectively acquire the position information from the two BLE active tags 4.

In Step S3, the mobile-body position locating unit 42 acquires the position information of the BLE communication unit 24, in other words, the position information of the forklift truck 10 on the basis of the two position information of the BLE active tags 4 acquired in Step S2 and the incident angles α [deg] and β [deg] of the signals respectively obtained from the BLE active tags 4 by being received by the BLE communication unit 24.

As described above, in the position locating system 100, the mobile-body position locating unit 42 locates the position of the forklift truck 10 on the basis of the incident angles α and β of the signals respectively transmitted by the two BLE active tags 4 and received by the BLE communication unit 24 and the position information of the two BLE active tags 4. Because wiring is not required, the BLE active tags 4 can be provided in any positions in the warehouse 1 with ease. Thus, even in a case in which many loads L are placed in the warehouse 1, it is possible to provide the BLE active tags 4 such that the position of the forklift truck 10 can be located. Therefore, regardless of the situation of the loads L in the warehouse 1, it is possible to detect the position of the forklift truck 10.

In addition, because the wiring is not required, the BLE active tags 4 are relatively cheap. Thus, it is possible to reduce the cost for additionally providing the BLE active tags 4 in the warehouse 1. Therefore, it is possible to, for example, additionally provide a new BLE active tag 4 at a position where the communication quality between the BLE communication unit 24 and the BLE active tag 4 is poor in the warehouse 1.

Next, a process in which the forklift truck 10 holds the load $L_T$ serving as the transport target object among the plurality of the loads L and a process of specifying the load $L_T$ among the plurality of the loads L will be described with reference to FIGS. 5 to 8.

Figure 5:
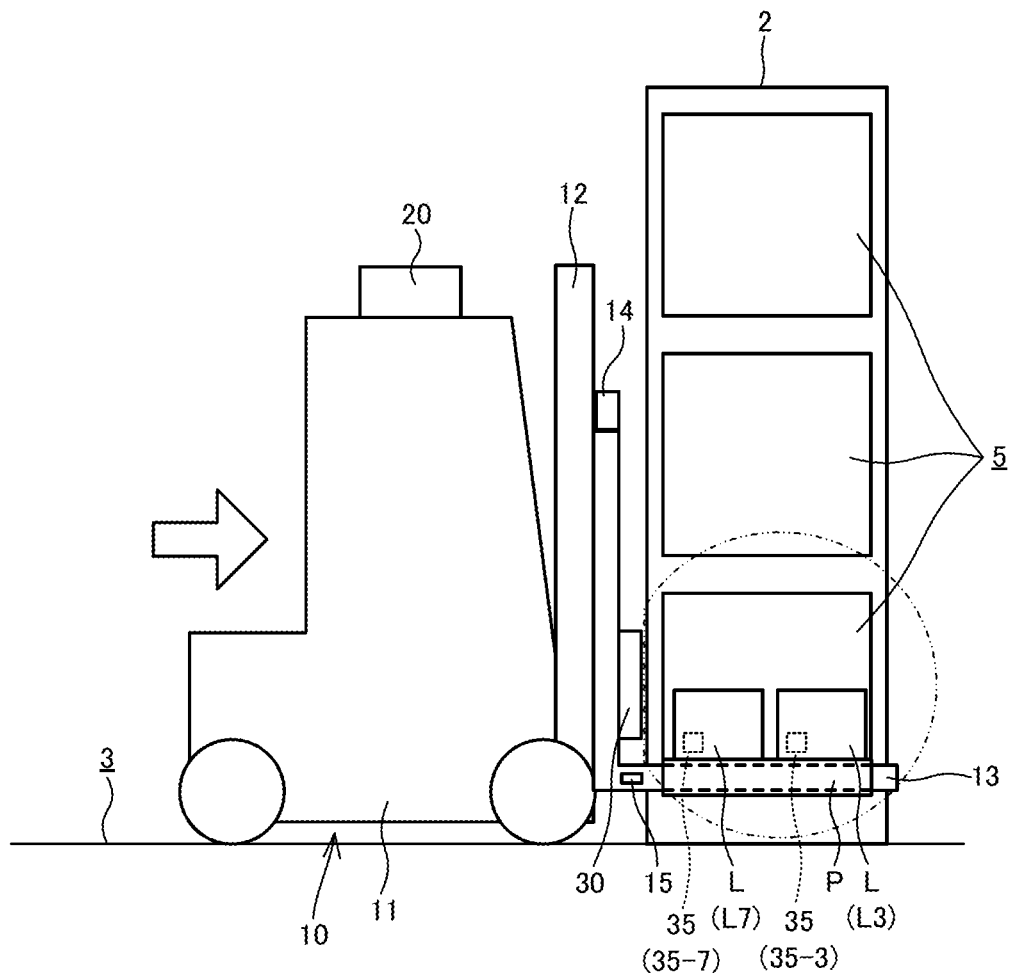
FIG. 5 is a side view for explaining a process in which the mobile body holds a transport target object among a plurality of target objects.
Figure 6:
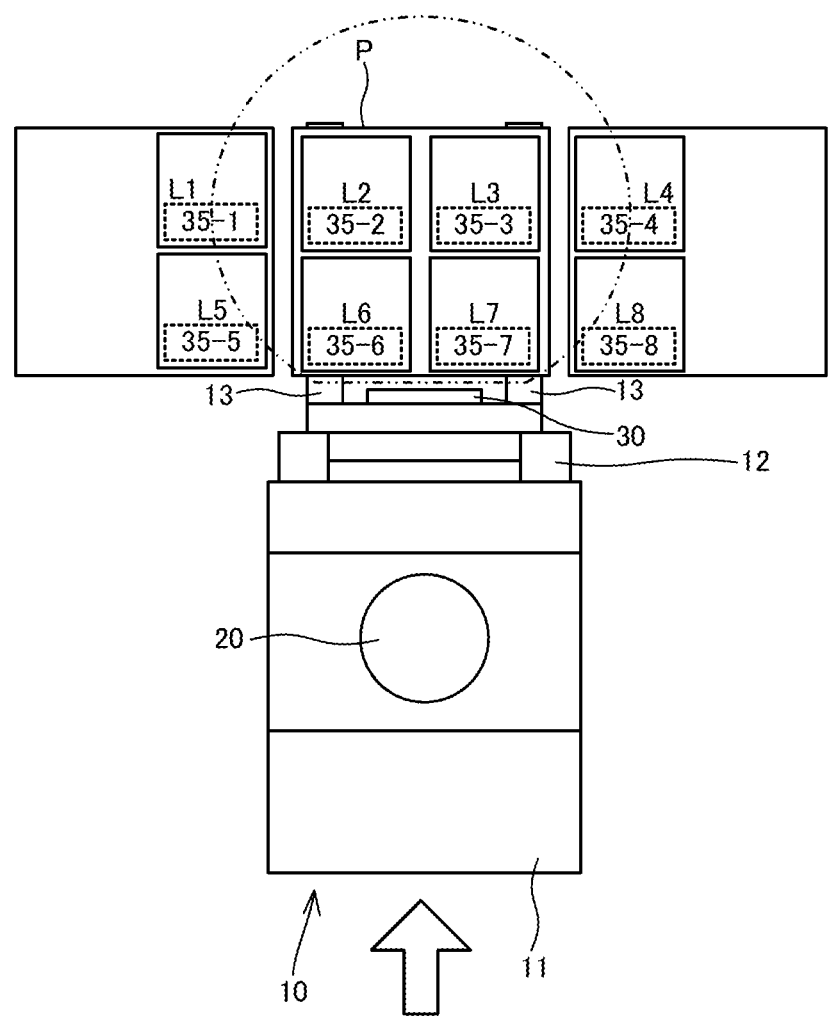
FIG. 6 is a plan view for explaining the process in which the mobile body holds the transport target object among the plurality of target objects.

A case in which the loads L2, L3, L6, and L7 placed on the pallet P among the loads L1 to L8 are transported by the forklift truck 10 as shown in FIGS. 5 and 6 will be described.

The forklift truck 10 first moves forward to approach the pallet P and insert the forks 13 into the pallet P. At this time, as shown in FIG. 6, the RFID reader 30 reads the reflected signals from all of the RFID tags 35-1 to 35-8 of the loads L1 to L8. From this state, the forklift truck 10 moves backwards and transports the loads L2, L3, L6, and L7. At this time, the vehicle-mounted device 20 repeatedly executes the routine shown in FIG. 7 at the fixed time intervals of, for example, 10 milliseconds.

In Step S11, the vehicle-mounted device 20 determines whether or not the load L is held by the forklift truck 10 on the basis of the electric signal transmitted from the gravimetric sensor 15. In Step S11, when it is determined that the load L is held by the forklift truck 10, the process proceeds to Step S12. On the other hand, in Step S11, when it is determined that the load L is not held by the forklift truck 10, the process proceeds to RETURN to repeat the whole process.

In Step S12, the RFID reader 30 is turned ON. In other words, the RFID reader 30 is turned ON when the gravimetric sensor 15 detects that the load L is held by the forklift truck 10.

In Step S13, the RFID reader 30 transmits the radio wave.

In Step S14, for the radio wave transferred to the RFID tags 35-1 to 35-8 of the loads L1 to L8, the RFID reader 30 reads the reflected signals returned from the respective RFID tags 35-1 to 35-8.

At this time, the transport target object specifying unit 41 keeps the information of the respective RFID tags 35-1 to 35-8 from which the reflected signals are detected. After this point, even if the RFID reader 30 detects the reflected signals from other RFID tags 35, the transport target object specifying unit 41 will not read the information. In other words, the transport target object specifying unit 41 specifies the RFID tag 35 of the load $L_T$ that is the transport target object among the RFID tags 35-1 to 35-8 the signals from which are read when the RFID reader 30 is turned ON.

In Step S15, the transport target object specifying unit 41 compares the reflected signals from the respective RFID tags 35-1 to 35-8 that have been detected previously and the reflected signals from the respective RFID tags 35-1 to 35-8 read in Step S14.

In Step S16, the transport target object specifying unit 41 determines whether or not the phases of the reflected signals from the respective RFID tags 35-1 to 35-8 have been changed. When it is determined that the phases have not been changed in Step S16, the process proceeds to Step S17, and when it is determined that the phases have been changed, the process proceeds to Step S18.

Figure 8:
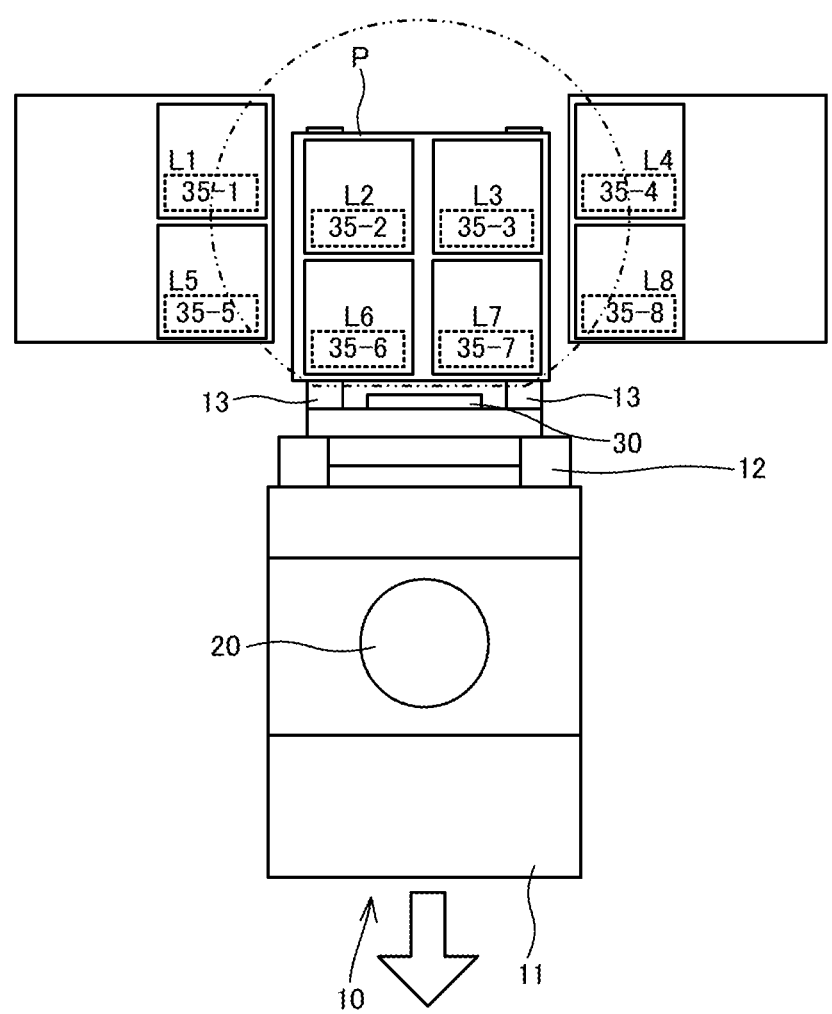
FIG. 8 is a plan view for explaining the process of specifying the transport target object among the plurality of target objects.

Here, referring to FIG. 8, because the positional relationships for the loads L2, L3, L6, and L7 being transported by the forklift truck 10 with respect to the RFID reader 30 have not been changed, the phases of the reflected signals have not been changed. In contrast, for the loads L1, L4, L5, and L8 that are not transported by the forklift truck 10, the positional relationships with respect to the RFID reader 30 have been changed. Thus, the phases of the reflected signals from the loads L1, L4, L5, and L8 are changed correspondingly to the change in the relative distance from the RFID reader 30.

Therefore, in Step S16, for the loads L2, L3, L6, and L7, it is determined that the phases have not been changed and the process proceeds to Step S17, and for the loads L1, L4, L5, and L8, it is determined that the phases have been changed and the process proceeds to Step S18.

In Step S17, the loads L2, L3, L6, and L7 the phases of the reflected signals from which have not been changed are specified that they are the transport target objects. On the other hand, in Step S18, the loads L1, L4, L5, and L8 the phases of the reflected signals from which have been changed are specified that they are not the transport target objects.

As described above, when there is no change in the phase of the reflected signal from the RFID tag 35 while the forklift truck 10 is moving, the transport target object specifying unit 41 determines that the load L with that RFID tag 35 is being transported. At the same time, when there is change in the phase of the reflected signal from the RFID tag 35, the transport target object specifying unit 41 determines that the load L with that RFID tag 35 is not being transported.

Therefore, it is possible to specify the load $L_T$ that is the transport target object being transported by the forklift truck 10 among the plurality of the loads L, without performing the scanning of the RFID tag 35 attached to the load L by the operator.

In addition, because the transport target object specifying unit 41 determines whether or not a target object is the transport target object on the basis of the change in the phases of the reflected signals, the load $L_T$ is specified while receiving the reflected signals from the RFID tags 35 of other loads L that are not being transported by the forklift truck 10.

Therefore, it is possible to specify the load $L_T$ that is the transport target object among the plurality of the loads L as soon as the forklift truck 10 starts moving.

Thus, it is possible to specify the load $L_T$ among the plurality of the loads L even in a case in which, for example, a moving distance of the load $L_T$ is short, and the transportation of the load $L_T$ is finished while receiving the reflected signals from the RFID tags 35 of other loads L that are not being transported.

Figure 7:
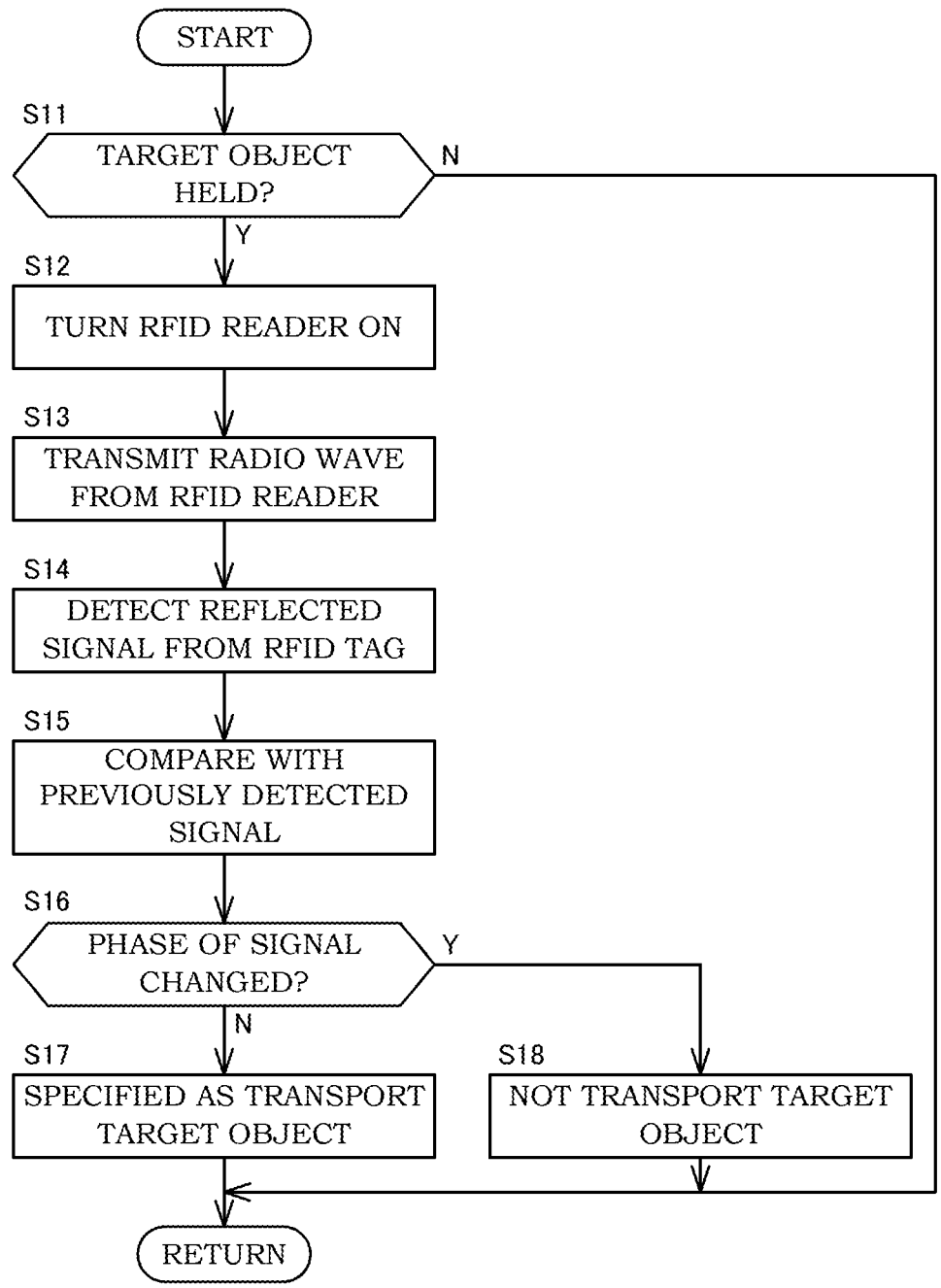
FIG. 7 is a flowchart for a process of specifying the transport target object among the plurality of target objects.

The routine shown in FIG. 7 may not be repeatedly executed at the fixed time intervals, and the processes of Steps S15 and S16 in FIG. 7 may be executed at the time when the transportation of the loads L2, L3, L6, and L7 is started and at the time when the forklift truck 10 has moved for a predetermined distance or when a predetermined time has elapsed since the start of the transportation.

Specifically, as the forklift truck 10 approaches to pick up the loads L2, L3, L6, and L7 that will be targets for an operation instruction command for delivery, the RFID reader 30 reads the reflected signals returned from the RFID tags 35-2, 35-3, 35-6, and 35-7 together with other reflected signals.

The time at which there is no change in the phases of the reflected signals from the loads L2, L3, L6, and L7 and there is change in the phases of the reflected signals from the loads L1, L4, L5, and L8 is defined as the time at which the transportation of the loads L2, L3, L6, and L7 is started, and the processes of Steps S15 and S16 in FIG. 7 may be executed after the forklift truck 10 has moved for 1 [m] from the position at the time at which the transportation of the loads L2, L3, L6, and L7 was started. This distance of 1 [m] is the distance corresponding to the length of the forks 13 of the forklift truck 10. In addition, the processes of Steps S15 and S16 in FIG. 7 may be executed after the time corresponding to the moving distance of the forklift truck 10 (for example 3 [sec]) has elapsed, without using the moving distance. In these cases, it is possible to reduce the frequency of executing the routine shown in FIG. 7.

In the above, the time at which the transportation of the loads L2, L3, L6, and L7 is started may also be defined as the time at which the load is picked up (held).

Next, determination that the load $L_T$ that is the transport target object is unloaded to the receiving portion 5 of the shelf 2 will be described with reference to FIGS. 9 and 10. The vehicle-mounted device 20 repeatedly executes the routine shown in FIG. 9 at the fixed time intervals of, for example, 10 milliseconds.

Figure 9:
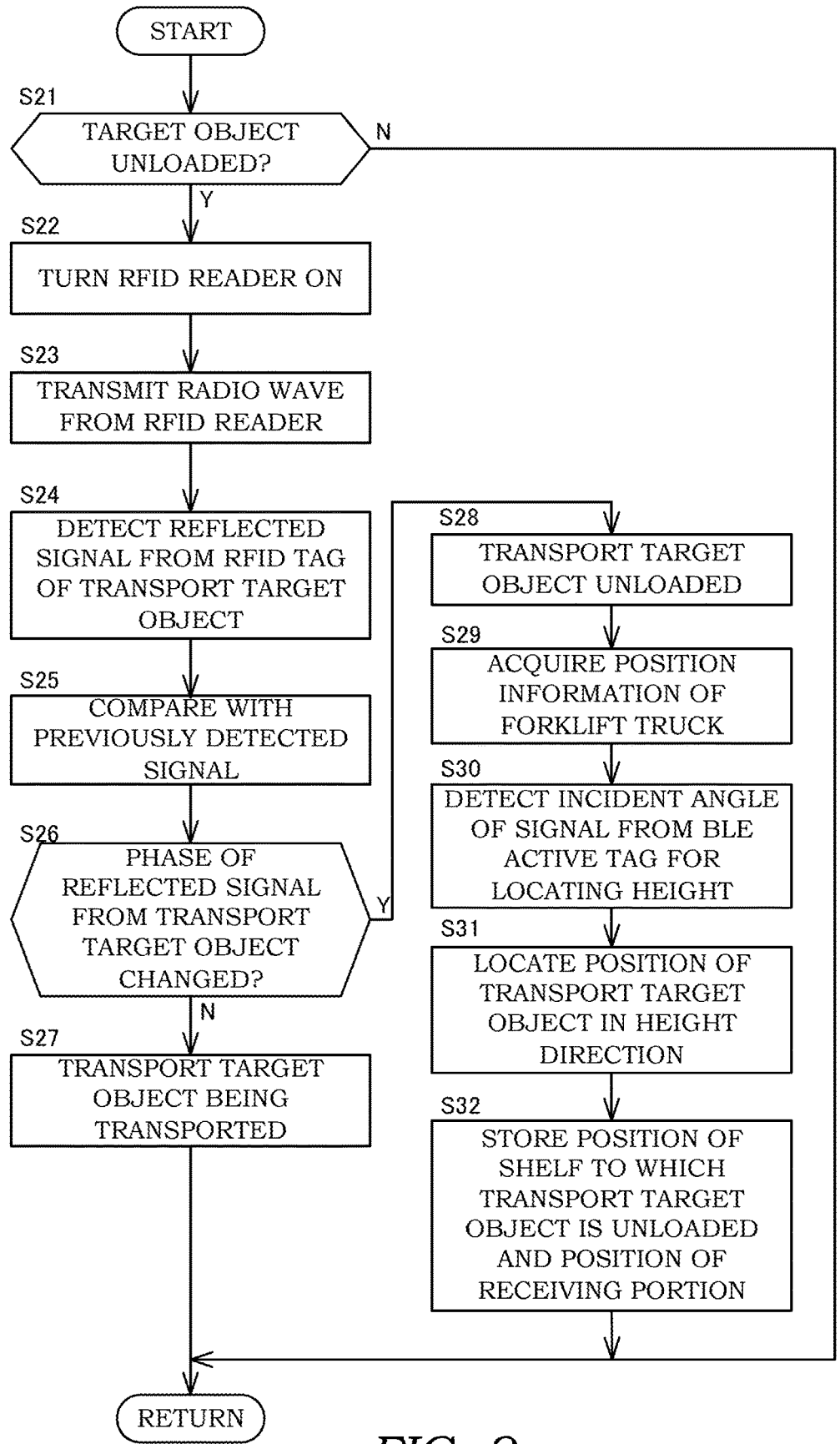
FIG. 9 is a flowchart for determining that the transport target object is unloaded.

As described with reference to FIGS. 5 to 8, the routine shown in FIG. 9 is executed in a state in which the loads L2, L3, L6, and L7 among the plurality of the loads L are specified as the transport target objects. In other words, the forklift truck 10 is in a state of transporting the loads L2, L3, L6, and L7.

In Step S21, the vehicle-mounted device 20 determines whether or not the load $L_T$ is unloaded by the forklift truck 10 on the basis of the electric signal transmitted from the gravimetric sensor 15. When it is determined that the load $L_T$ is unloaded by the forklift truck 10 in Step S21, the process proceeds to Step S22. On the other hand, when it is determined that the load $L_T$ is not unloaded by the forklift truck 10 in Step S21, in other words, when it is determined that the load $L_T$ is held by the forklift truck 10, the process proceeds to RETURN to repeat the whole process.

In Step S22, the RFID reader 30 is turned ON. In other words, the RFID reader 30 is turned ON when the gravimetric sensor 15 detects that the forklift truck 10 has unloaded the load $L_T$.

In Step S23, the RFID reader 30 transmits the radio wave.

In Step S24, for the radio wave transferred to the RFID tags 35-2, 35-3, 35-6, and 35-7 of the loads L2, L3, L6, and L7 that are being transported by the forklift truck 10, the RFID reader 30 reads the reflected signals returned from the respective RFID tags 35-2, 35-3, 35-6, and 35-7.

At this time, the transport target object specifying unit 41 keeps the information of the RFID tags 35-2, 35-3, 35-6, and 35-7 of the loads L2, L3, L6, and L7 that are being transported by the forklift truck 10. After this point, even if the RFID reader 30 detects the reflected signals from other RFID tags 35, the transport target object specifying unit 41 will not read the information. In other words, the transport target object specifying unit 41 specifies the RFID tag 35 of the unloaded load $L_T$ among the RFID tags 35-2, 35-3, 35-6, and 35-7 of the loads L2, L3, L6, and L7 that are being transported by the forklift truck 10.

In Step S25, the transport target object specifying unit 41 compares the reflected signals from the respective RFID tags 35-2, 35-3, 35-6, and 35-7 that have been detected previously and the reflected signals from the respective RFID tags 35-2, 35-3, 35-6, and 35-7 read in Step S24.

In Step S26, the transport target object specifying unit 41 determines whether or not the phases of the reflected signals from the respective RFID tags 35-2, 35-3, 35-6, and 35-7 have been changed. When it is determined that the phases have not been changed in Step S26, the process proceeds to Step S27 to specify that the transportation by the forklift truck 10 is still continued, and the process proceeds to RETURN. On the other hand, when it is determined that the phases have been changed in Step S26, the process proceeds to Step S28.

Figure 10:
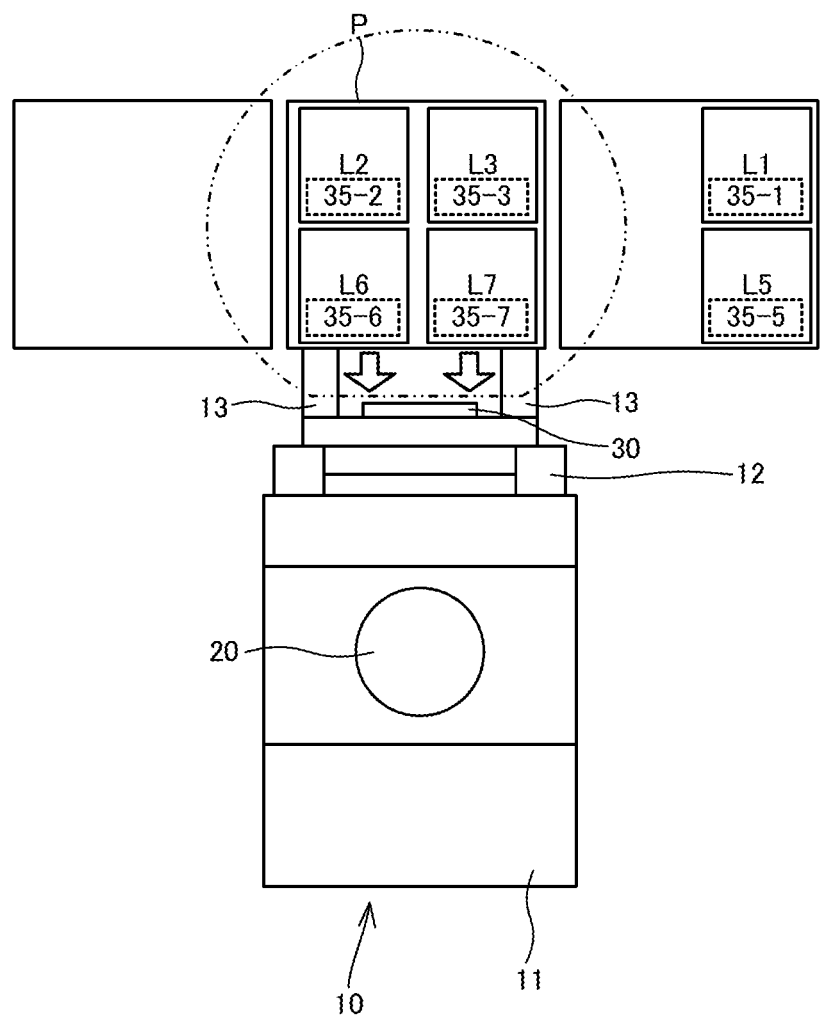
FIG. 10 is a plan view for explaining the process of determining that the transport target object is unloaded.

Here, referring to FIG. 10, the forklift truck 10 has transported and unloaded the loads L2, L3, L6, and L7 to a predetermined site and is about to leave by moving backwards. Thus, the positional relationships for the loads L2, L3, L6, and L7 that have been transported by the forklift truck 10 with respect to the RFID reader 30 are changed. Therefore, the phases of the reflected signals from the loads L2, L3, L6, and L7 are changed correspondingly to the change in the relative distance from the RFID reader 30.

Therefore, in Step S26, it is determined that the phases are changed for the loads L2, L3, L6, and L7, and the process proceeds to Step S28.

In Step S28, it is specified that the forklift truck 10 has unloaded the loads L2, L3, L6, and L7 to the receiving portion 5 of the shelf 2.

In Step S29, the mobile-body position locating unit 42 acquires the position information of the forklift truck 10 (in the X axis direction and the Y axis direction).

In Step S30, the BLE communication unit 24 detects the signal transmitted from the BLE active tag 14.

In Step S31, the position information of the forks 13 in the height direction (in the Z axis direction), in other words, the position information of the loads L2, L3, L6, and L7 in the height direction is acquired on the basis of the incident angle γ [deg] of the reflected signals from the BLE active tags 4 (see FIG. 3).

In Step S32, the load position locating unit 43 specifies the receiving portion 5 where the transport target object has been unloaded. Specifically, the unloaded positions of the loads L2, L3, L6, and L7 (the position of the receiving portion 5 on which transported loads are placed) are stored in the data base 23b of the vehicle-mounted device 20 by comparing the preset position of the shelf 2 with the position of the receiving portion 5 in the height direction on the basis of the position information of the forklift truck 10 (in the X axis direction and the Y axis direction) acquired in Step S29 and the position information of the forks 13 in the height direction (in the Z axis direction) acquired in Step S31. Instead, the unloaded positions of the loads L2, L3, L6, and L7 may be stored in the data base 53b of the computer 50.

As described above, when there is change in the phase of the reflected signal from the RFID tag 35 attached to the load $L_T$ while the forklift truck 10 is moving, the transport target object specifying unit 41 determines that the load $L_T$ attached with the RFID tag 35 is unloaded to the receiving portion 5. In addition, the load position locating unit 43 stores, as the unloaded position of the load $L_T$, the position information of the forklift truck 10 (in the X axis direction and the Y axis direction) and the position information of the forks 13 in the height direction (the Z axis direction) in the data base 23b of the vehicle-mounted device 20.

Therefore, it is possible to determine that the load $L_T$ that is the transport target object transported by the forklift truck 10 has been unloaded to the receiving portion 5 of the shelf 2 without performing the scanning of the RFID tag 35 attached to the load L by the operator. In addition, it is possible to store the position information for the unloaded position of the load $L_T$ that was the transport target object in the vehicle-mounted device 20 in an associated manner.

Similarly to the routine shown in FIG. 7, the routine shown in FIG. 9 may not be repeatedly executed at the fixed time intervals, and the routine shown in FIG. 9 may executed on the basis of the moved distance by the forklift truck 10 or the time corresponding to the moved distance. In these cases, it is possible to reduce the frequency of executing the routine shown in FIG. 9.

In addition, an interior of the warehouse 1 may be divided into a plurality of areas in advance in accordance with the positions for arranging the shelves 2 in the warehouse 1, and when the forklift truck 10 is positioned in a certain area, it may be possible to determine that the load $L_T$ is unloaded by the forklift truck 10 to the shelf 2 in that area.

At this time, there may be a case in which, when the load $L_T$ is unloaded to the shelf 2 in a certain area by the forklift truck 10, because the passage 3 is narrow, the vehicle-mounted device 20 of the forklift truck 10 is determined to be positioned at an area different from the area including the shelf 2 to which the load $L_T$ is unloaded. In such a case, it is also possible to specify the travelling direction of the forklift truck 10 from histories of the positions of the forklift truck 10 and to determine that the load $L_T$ is unloaded by the forklift truck 10 in the area including the shelf 2 located at the forward side in the travelling direction.

Next, a modification of a process in which the forklift truck 10 holds the load $L_T$ that is the transport target object among the plurality of the loads L and in which the load $L_T$ is specified among the plurality of the loads L will be described with reference to FIGS. 11 and 12. The vehicle-mounted device 20 repeatedly executes the routine shown in FIG. 11 at the fixed time intervals of, for example, 10 milliseconds.

Because the processes from Step S11 to Step S15 are the same as those in FIG. 7, the description thereof will be omitted.

In Step S36, the transport target object specifying unit 41 determines whether or not the reflected signals from the respective RFID tags 35-1 to 35-8 are disappeared. In Step S36, when it is determined that the reflected signals are not disappeared, the process proceeds to Step S17, and when it is determined that the reflected signals are disappeared, the process proceeds to Step S18.

Figure 12:
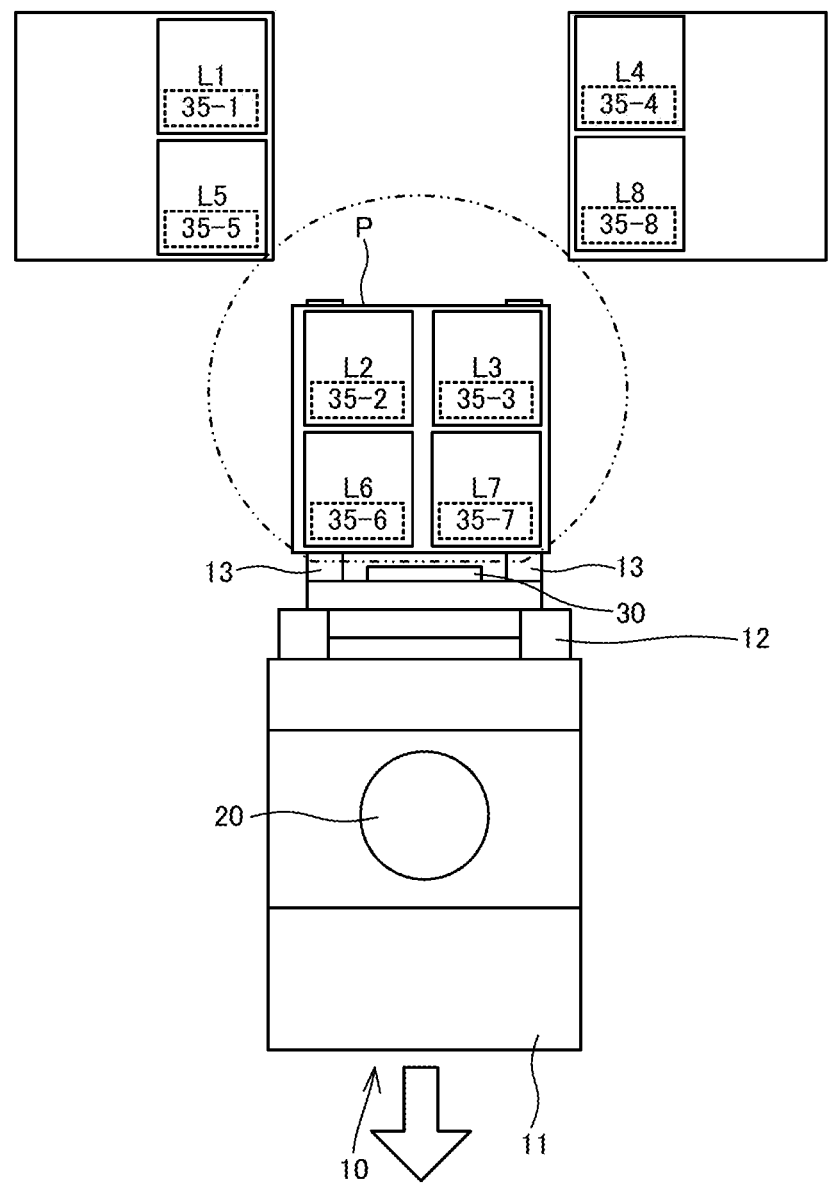
FIG. 12 is a plan view for explaining the modification of the process of specifying the transport target object among the plurality of target objects.

Here, referring to FIG. 12, because the positional relationships for the loads L2, L3, L6, and L7 being transported by the forklift truck 10 with respect to the RFID reader 30 have not been changed, there is no change in the state of the reflected signal. In contrast, the loads L1, L4, L5, and L8 that are not transported by the forklift truck 10 are positioned outside a detectable range of the RFID reader 30. Thus, the RFID reader 30 has become unable to read the reflected signals from the loads L1, L4, L5, and L8 anymore.

Therefore, in Step S36, for the loads L2, L3, L6, and L7, it is determined that the states of the reflected signals have not been changed and the process proceeds to Step S17, and for the loads L1, L4, L5, and L8, it is determined that the reflected signals have disappeared and the process proceeds to Step S18.

In Step S17, the loads L2, L3, L6, and L7 the states of the reflected signals from which have not been changed are specified that they are the transport target objects. On the other hand, in Step S18, the loads L1, L4, L5, and L8 the reflected signals from which have disappeared are specified that they are not the transport target objects.

As described above, when the reflected signals from the RFID tag 35 attached to the load L are detected while the forklift truck 10 is moving, the transport target object specifying unit 41 determines that the load L with that RFID tag 35 is being transported. At the same time, when the reflected signals from the RFID tag 35 attached to the load L have become unable to be detected, the transport target object specifying unit 41 determines that the load L with that RFID tag 35 is not being transported.

Therefore, it is possible to specify the load $L_T$ that is the transport target object being transported by the forklift truck 10 among the plurality of the loads L, without performing the scanning of the RFID tag 35 attached to the load L by the operator.

Figure 11:
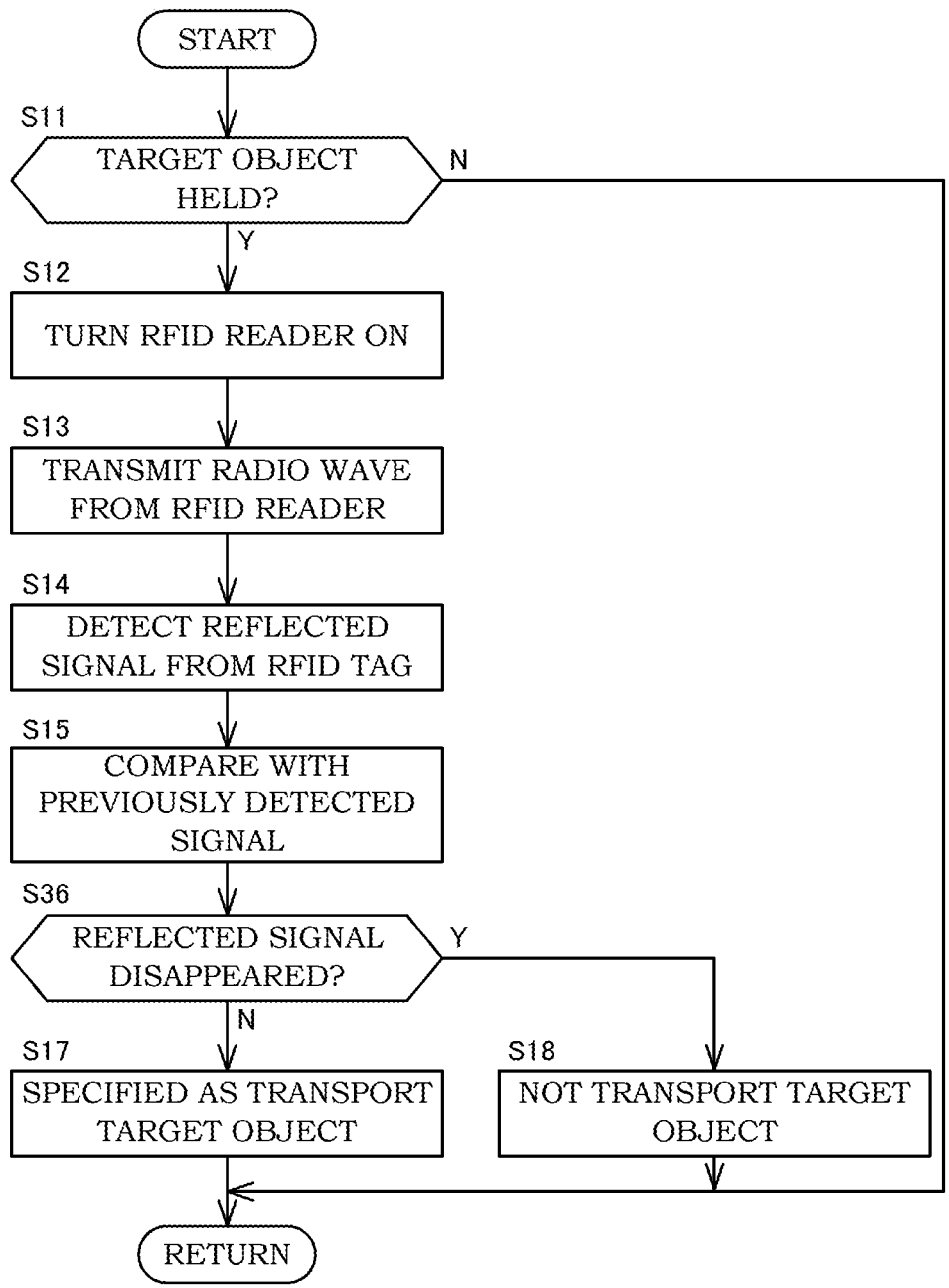
FIG. 11 is a flowchart of a modification of the process of specifying the transport target object among the plurality of target objects.

Similarly to the routines shown in FIGS. 7 and 9, the routine shown in FIG. 11 may not be repeatedly executed at the fixed time intervals, and the routine shown in FIG. 11 may executed on the basis of the moved distance of the forklift truck 10 or the time corresponding to the moved distance. In these cases, it is possible to reduce the frequency of executing the routine shown in FIG. 11.

According to the embodiment mentioned above, the advantages described below are afforded.

The mobile-body position locating unit 42 locates the position of the forklift truck 10 on the basis of the incident angles α and β of the signals obtained by the BLE communication unit 24 from the BLE active tags 4 and the position information of the two BLE active tags 4. Because wiring is not required, the BLE active tags 4 can be provided in any positions in the warehouse 1 with ease. Thus, even in a case in which many loads L are placed in the warehouse 1, it is possible to provide the BLE active tags 4 such that the position of the forklift truck 10 can be located. Therefore, regardless of the situation of the loads L in the warehouse 1, it is possible to detect the position of the forklift truck 10.

In addition, because the wiring is not required, the BLE active tags 4 are relatively cheap. Thus, it is possible to reduce the cost for additionally providing the BLE active tags 4 in the warehouse 1. Therefore, it is possible to, for example, additionally provide a new BLE active tag 4 at a position where the communication quality between the BLE communication unit 24 and the BLE active tag 4 is poor in the warehouse 1.

In addition, when there is change in the phase of the reflected signal from the RFID tag 35 attached to the load $L_T$ while the forklift truck 10 is moving, the transport target object specifying unit 41 determines that the load $L_T$ attached with the RFID tag 35 is unloaded to the receiving portion 5.

Therefore, it is possible to determine that the load $L_T$ that is the transport target object transported by the forklift truck 10 has been unloaded to the receiving portion 5 of the shelf 2 without performing the scanning of the RFID tag 35 attached to the load L by the operator. In addition, it is possible to store the position information of the unloaded load $L_T$ that was the transport target object in the vehicle-mounted device 20 in an associated manner.

As described above, with the position locating system 100, it is possible to acquire the position information of the forklift truck 10 through the communication between BLE communication unit and the BLE active tags 4 and to determine that the load L is being transported and the load L is unloaded as the RFID reader 30 reads the RFID tag 35. Therefore, it is possible to manage the position of the load L and entrance and delivery of the load L in the warehouse 1 without requiring the scanning operation by the operator.

In the above, although the embodiment of the present invention has been described, the above-mentioned embodiment merely illustrates an applicable example of the present invention, and the above-mentioned embodiment is not intended to limit the technical scope of the present invention to the specific configuration in the above-mentioned embodiment.

For example, in the above-mentioned embodiment, although the load $L_T$ is transported by the forklift truck 10, instead, the load $L_T$ may be transported by other mobile bodies or the operator such as a hand truck, a hand lift, and so forth. In this case, other mobile body or the operator is provided with a device corresponding to the vehicle-mounted device 20.

In addition, in the above-mentioned embodiment, the communication is performed in the BLE mode by providing the BLE active tags 4 in the warehouse 1 and by providing the BLE communication unit 24 on the vehicle-mounted device 20, thereby locating the position of the forklift truck 10. Instead of this configuration, the position of the forklift truck 10 may be located by performing the communication in, for example, the UWB (Ultra Wide Band) mode. In addition, in the above-mentioned embodiment, although a description has been given of an example in which the BLE active tags 4 are provided in the indoor warehouse 1, for example, the present invention is not limited to this configuration, and even in outdoor, it is possible to locate the position of the mobile body or the operator provided with the vehicle-mounted device 20 as described above by providing the BLE active tags 4 at predetermined positions.

In addition, in the above-mentioned embodiment, although the vehicle-mounted device 20 is connected to the computer 50 via the wireless router 60, the vehicle-mounted device 20 may be connected to the computer 50 via the internet.

In addition, the computer 50 may be connected to a cloud server on the internet, and the above-described respective processes, which are executed by the vehicle-mounted device 20 and the computer 50 serving as the executing entities, may be executed by the cloud server serving as the executing entity. Furthermore, in a case in which the cloud server is used as the executing entity for the above-described respective processes, the position locating system 100 may not be provided with the computer 50, and it may be possible to employ a configuration in which the respective devices, such as the vehicle-mounted device 20, etc., are directly connected to the cloud server via the internet.

In addition, the various programs executed by the vehicle-mounted device 20 and the computer 50 may be used by being stored in, for example, a non-transitory computer readable medium such as a CD-ROM, etc.

The present application claims a priority based on Japanese Patent Application No. 2018-066028 filed with the Japan Patent Office on Mar. 29, 2018, all the contents of which are hereby incorporated by reference.

The invention claimed is:

1. A position locating system comprising:
a plurality of position locating tags provided in an indoor space, the position locating tags being associated with coordinate information corresponding to positions of the position locating tags in the indoor space in advance;
a transceiver provided on a mobile body configured to move in the indoor space, the transceiver being configured to acquire transmission signals transmitted from the position locating tags; and
a processor configured to determine a coordinate position of the mobile body based on:
the transmission signals from the position locating tags acquired by the transceiver and the coordinate information of the position locating tags, and
incident angles of transmission signals transmitted from two of the plurality of position locating tags and the coordinate information of the two of the plurality of position locating tags.

2. The position locating system according to claim 1, wherein the processor is configured to determine the coordinate position of the mobile body based on communication quality between the plurality of the position locating tags and the transceiver provided on the mobile body.

3. The position locating system according to claim 1, wherein the processor is further configured to determine an unloaded position of a target object transported by the mobile body based on the coordinate position of the mobile body.

4. The position locating system according to claim 2, wherein the processor is further configured to determine an unloaded position of a target object transported by the mobile body based on the coordinate position of the mobile body.

5. The position locating system according to claim 3, further comprising:
a height locating tag provided on a vertically moving portion, the vertically moving portion being provided on the mobile body so as to move the target object up and down,
wherein the processor is further configured to determine the unloaded position of the target object in a height direction based on a signal from the height locating tag acquired by the transceiver.

6. The position locating system according to claim 4, further comprising:
a height locating tag provided on a vertically moving portion, the vertically moving portion being provided on the mobile body so as to move the target object up and down,
wherein the processor is further configured to determine the unloaded position of the target object in a height direction based on a signal from the height locating tag acquired by the transceiver.

7. The position locating system according to claim 5, further comprising:
passive tags respectively provided on a plurality of target objects;
a reader provided on the mobile body, the reader being configured to transfer radio waves to the passive tags and to read reflected signals returned from the passive tags; and
a transport target object specifying unit configured to specify a transport target object among the plurality of the target objects based on a difference in a change of a state of the reflected signals from the passive tags read by the reader when the mobile body is moved.

8. The position locating system according to claim 6, further comprising:
passive tags respectively provided on a plurality of target objects;
a reader provided on the mobile body, the reader being configured to transfer radio waves to the passive tags and to read reflected signals returned from the passive tags; and
a transport target object specifying unit configured to specify a transport target object among the plurality of the target objects based on a difference in a change of a state of the reflected signals from the passive tags read by the reader when the mobile body is moved.

9. The position locating system according to claim 1, wherein the processor is configured to determine the coordinate position of the mobile body based on the transmission signals from the two of the plurality of position locating tags even when communication from a number of the plurality of position locating tags is blocked by an RFID blocking material in the indoor space.

10. The position locating system according to claim 1, wherein the processor is configured to select the two of the plurality of position locating tags used to determine the coordinate position of the mobile body based on communication quality between the plurality of the position locating tags and the transceiver provided on the mobile body.

11. The position locating system according to claim 10, wherein the processor is configured to determine the coordinate position of the mobile body based on the transmission signals from the two of the plurality of position locating tags even when communication from a number of the plurality of position locating tags is blocked by an RFID blocking material in the indoor space.

12. A position locating method comprising:
a step of acquiring, by a mobile body moving in an indoor space, transmission signals transmitted from a plurality of position locating tags provided in the indoor space, the position locating tags being associated with coordinate information corresponding to positions of the position locating tags in the indoor space in advance; and a step of determining a coordinate position of the mobile body based on:
the transmission signals transmitted from the position locating tags and the coordinate information of the position locating tags, and
incident angles of transmission signals transmitted from two of the plurality of position locating tags and the coordinate information of the two of the plurality of position locating tags.

13. A non-transitory computer-readable medium storing a program for causing a computer to execute:
a process of acquiring, by a mobile body moving in an indoor space, transmission signals transmitted from a plurality of position locating tags provided in the indoor space, the position locating tags being associated with coordinate information corresponding to positions of the position locating tags in the indoor space in advance; and
a process of determining a coordinate position of the mobile body based on:
the transmission signals transmitted from the position locating tags and the coordinate information of the position locating tags, and
incident angles of transmission signals transmitted from two of the plurality of position locating tags and the coordinate information of the two of the plurality of position locating tags.

* * * * *